Figure 1:
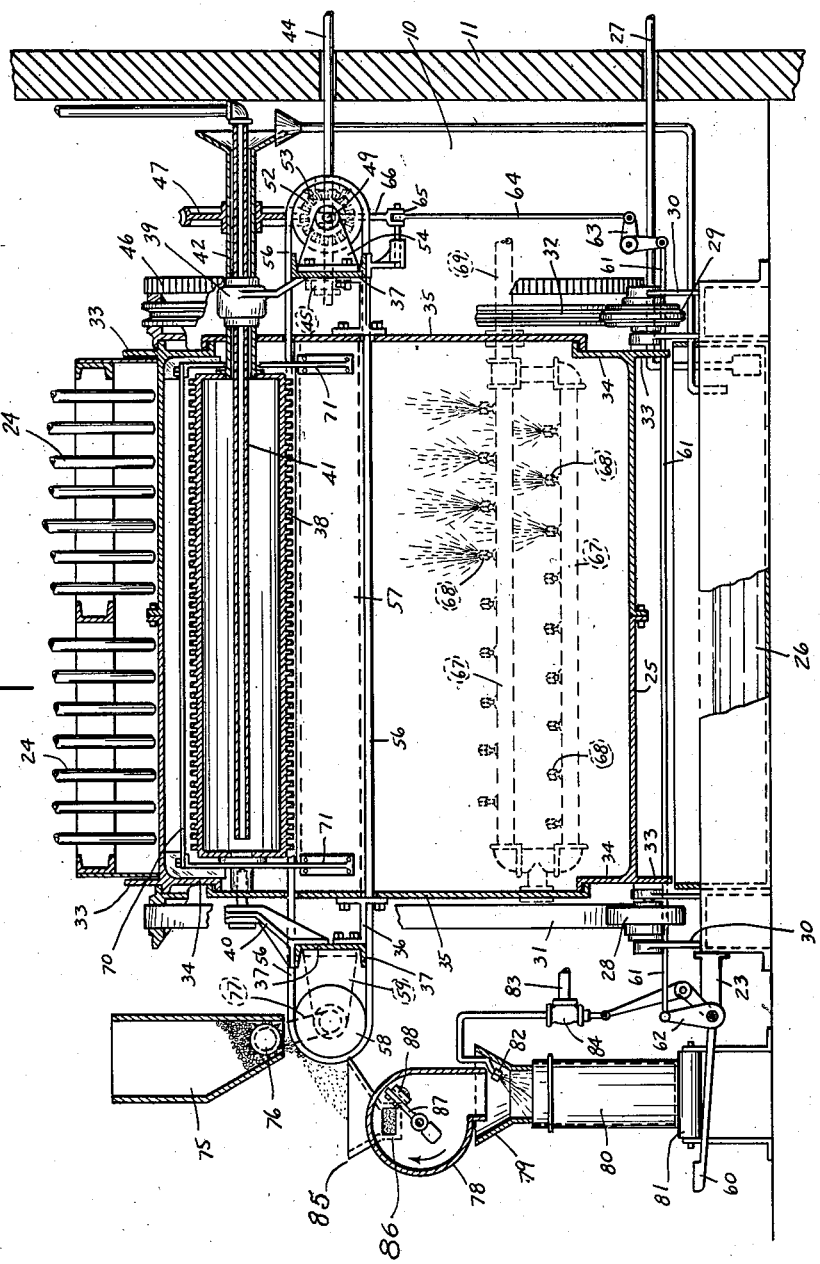

Feb. 10, 1931.  C. W. VOGT  1,791,774
PROCESS AND APPARATUS FOR FREEZING ICE CREAM AND THE LIKE
Filed Oct. 21, 1927  4 Sheets-Sheet 2

INVENTOR.
CLARENCE W. VOGT.

BY
ATTORNEYS.

Feb. 10, 1931. C. W. VOGT 1,791,774
PROCESS AND APPARATUS FOR FREEZING ICE CREAM AND THE LIKE
Filed Oct. 21, 1927 4 Sheets-Sheet 3
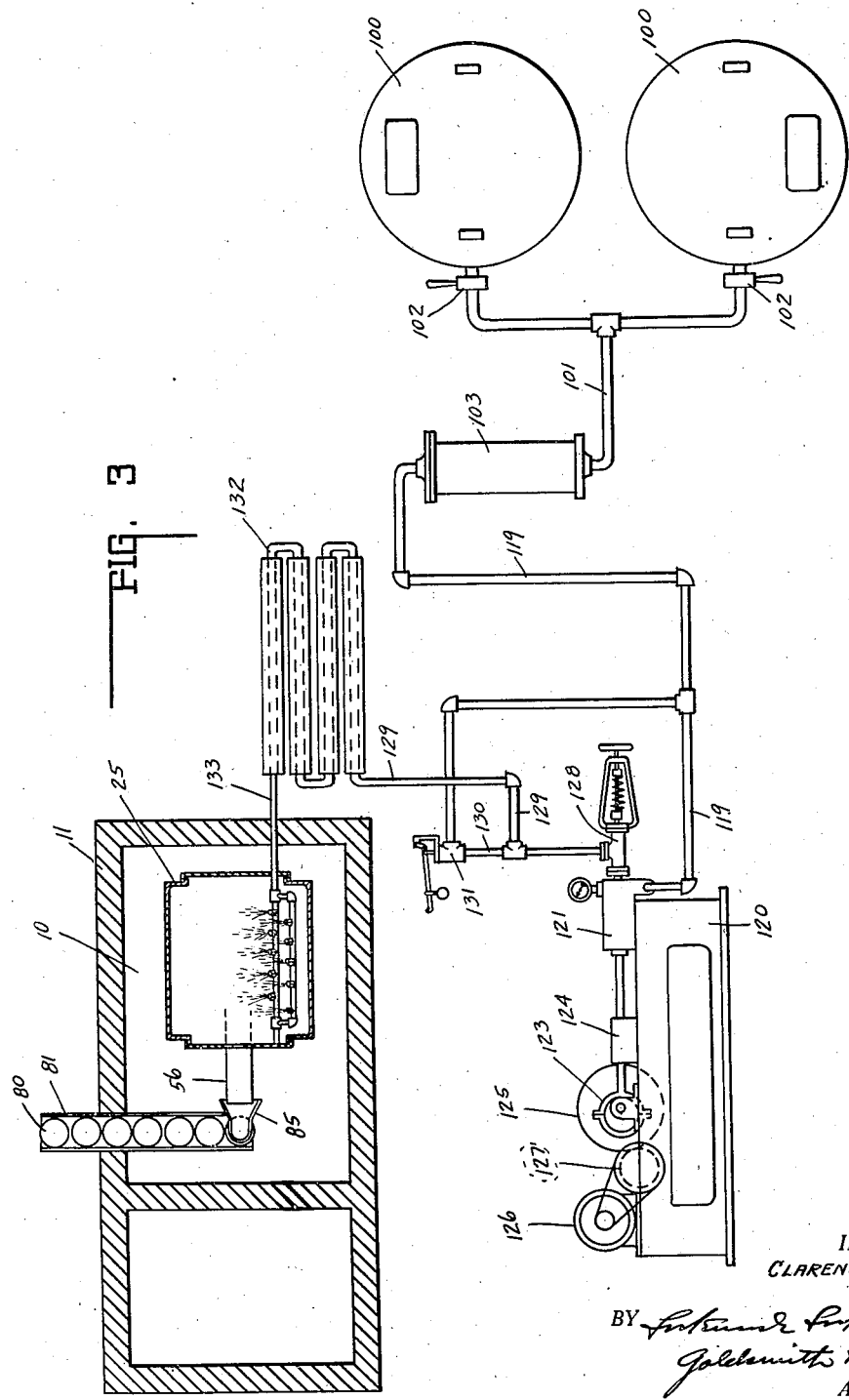
INVENTOR.
CLARENCE W. VOGT.
BY
ATTORNEYS.

Feb. 10, 1931.  C. W. VOGT  1,791,774
PROCESS AND APPARATUS FOR FREEZING ICE CREAM AND THE LIKE
Filed Oct. 21, 1927  4 Sheets-Sheet 4
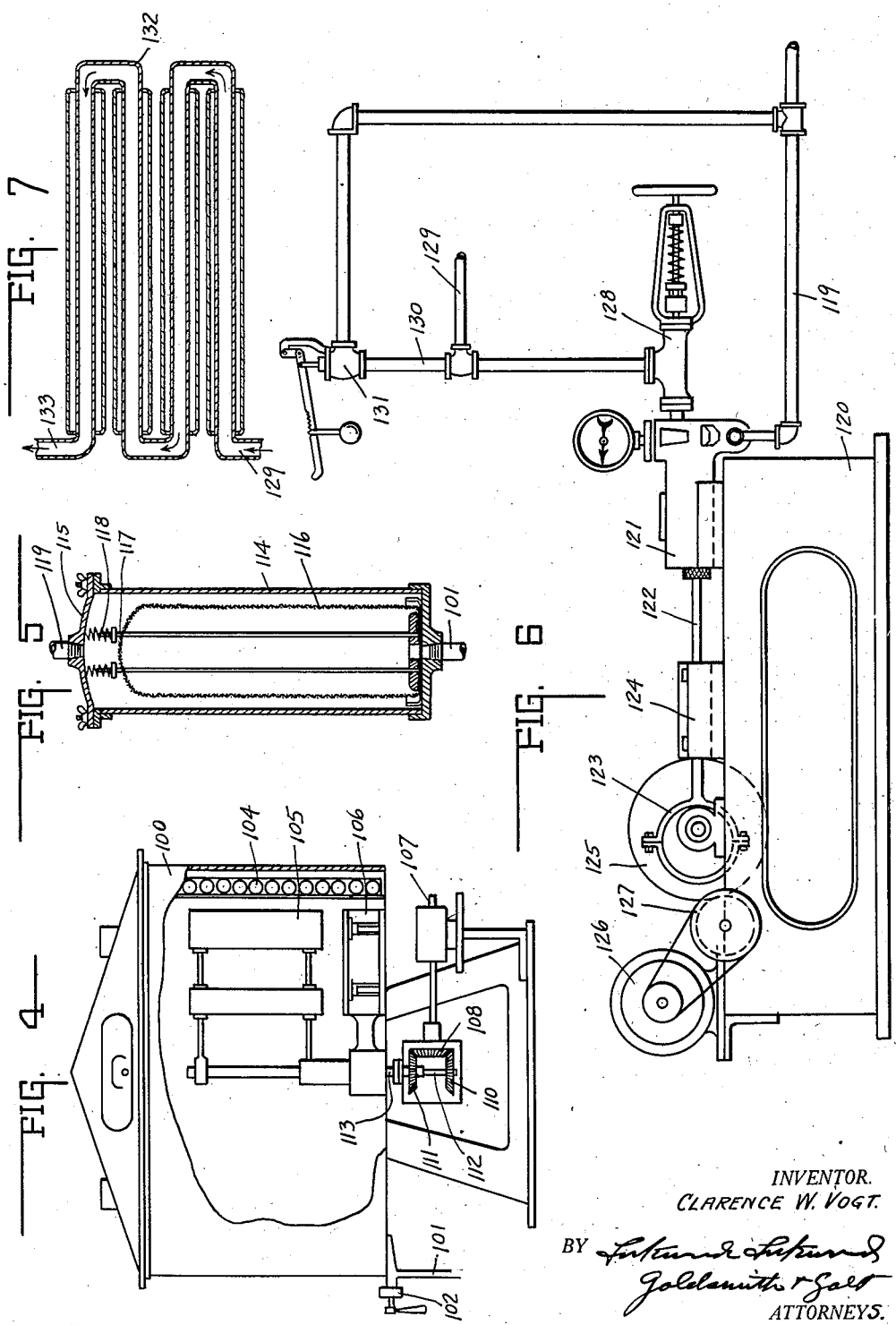
INVENTOR.
CLARENCE W. VOGT.
BY
ATTORNEYS.

Patented Feb. 10, 1931

1,791,774

UNITED STATES PATENT OFFICE

CLARENCE W. VOGT, OF LOUISVILLE, KENTUCKY, ASSIGNOR TO VOGT INSTANT FREEZERS, INC., A CORPORATION OF DELAWARE

PROCESS AND APPARATUS FOR FREEZING ICE CREAM AND THE LIKE

Application filed October 21, 1927. Serial No. 227,665.

This invention relates to a new and novel process and apparatus for continuously freezing ice cream and the like, and for cooling and bleaching vegetable oils.

One object of the invention is to provide a process and associated apparatus employed thereby which will continuously supply the proper mix, freeze and deliver the ice cream without the necessity of passing it thru certain steps in batches as has heretofore been customary. Thus, considerable time is saved, as well as time and labor involved in preparing and handling various batches, and the finished product will be discharged continuously from the machine as rapidly as the mix is fed thereto.

Heretofore several steps have been employed in the commercial manufacture of ice cream involving the freezing thereof in batches. The first step comprises the pasteurization of the mix, at which time the sugar, gelatine and flavoring, if desired, are added and thoroly dissolved by stirring. After the pasteurization is complete the mix is homogenized, as well known in the art.

The second step in the old process requires the holding of this mixture in refrigerated tanks while intermittently agitating the same for a period of 24 to 48 hours. This is termed "ageing" or "ripening". The purpose of this step in the present practice is to thicken or make the mix more viscous so that it will permit of "whipping" in of sufficient air in the following step.

The third step of the old process consists in drawing over a batch of this ripened mix into a freezer where additional flavoring, color, fruit or nuts are added. The mix is thus cooled down to the freezing point and held at this point while air is whipped into the mix causing the desired "over-run", at which time the mix, partially frozen, is withdrawn into cans.

The fourth step of the old process comprises the placing of the semi-frozen batch of mix in a refrigerated room or vessel for further freezing and hardening. Thus, not only is a quantity of time consumed of from 24 to 48 hours, but each batch is separately handled thru four different steps.

The principal object of this invention is to combine these steps into one continuous process of handling the mix from the pasteurizer or mixer direct to the can or container in which it is molded, in a closed circuit, thereby eliminating all manual handling of the batch system, as well as the time consumed, as above set forth, and as will be hereinafter more fully set forth and described.

One feature of the process resides in discharging a mist-like spray of the mix into a refrigerant chamber which is maintained at such temperature as to partially freeze the fine particles of the spray while passing thru the atmosphere so that a certain amount of air or gas will be incorporated therewith to give the proper "over-run", and thereafter causing the spray to fall or impinge upon a freezing surface which will harden the particles in the form of finely frozen crystals.

Another feature of the invention resides in pasteurizing batches of the mix in such a manner that properly pasteurized mix may be continuously drawn thru the machine, including its passage into a homogenizer and pre-cooler, whereby a constant stream of properly conditioned mix will be discharged into the freezer, and a constant stream of frozen mix will be discharged therefrom.

Another object of the invention resides in the application of the process to the cooling and bleaching of vegetable oils which are used in place of lard, and cooling and refrigerating similar substances. Heretofore difficulty has been experienced in the method of cooling vegetable oils by contact with outside refrigerating surfaces, wherein the cooled oils are subsequently whipped to incorporate air therein for bleaching. This difficulty is due to the oxygen in the air. The process herein described pertaining to this feature, eliminates this difficulty and makes the process more simple and practical by discharging the oils or similar substances under pressure thru a spray within a closed container or drum from which the oxygen has been excluded. The atmosphere of said drum may be in the nature of hydrogen or carbon dioxide. Furthermore, by discharging a spray thru such refrigerating atmosphere, the desired atmosphere or gas may be readily incorporated in the particles during their cooling process, so as to eliminate the difficulties heretofore experienced in whipping air therein for bleaching purposes. This gives a much better bleaching effect due to the fineness of the breaking up of the substances to be cooled rather than cooling it in the heavy liquid form as heretofore.

Figure 2:
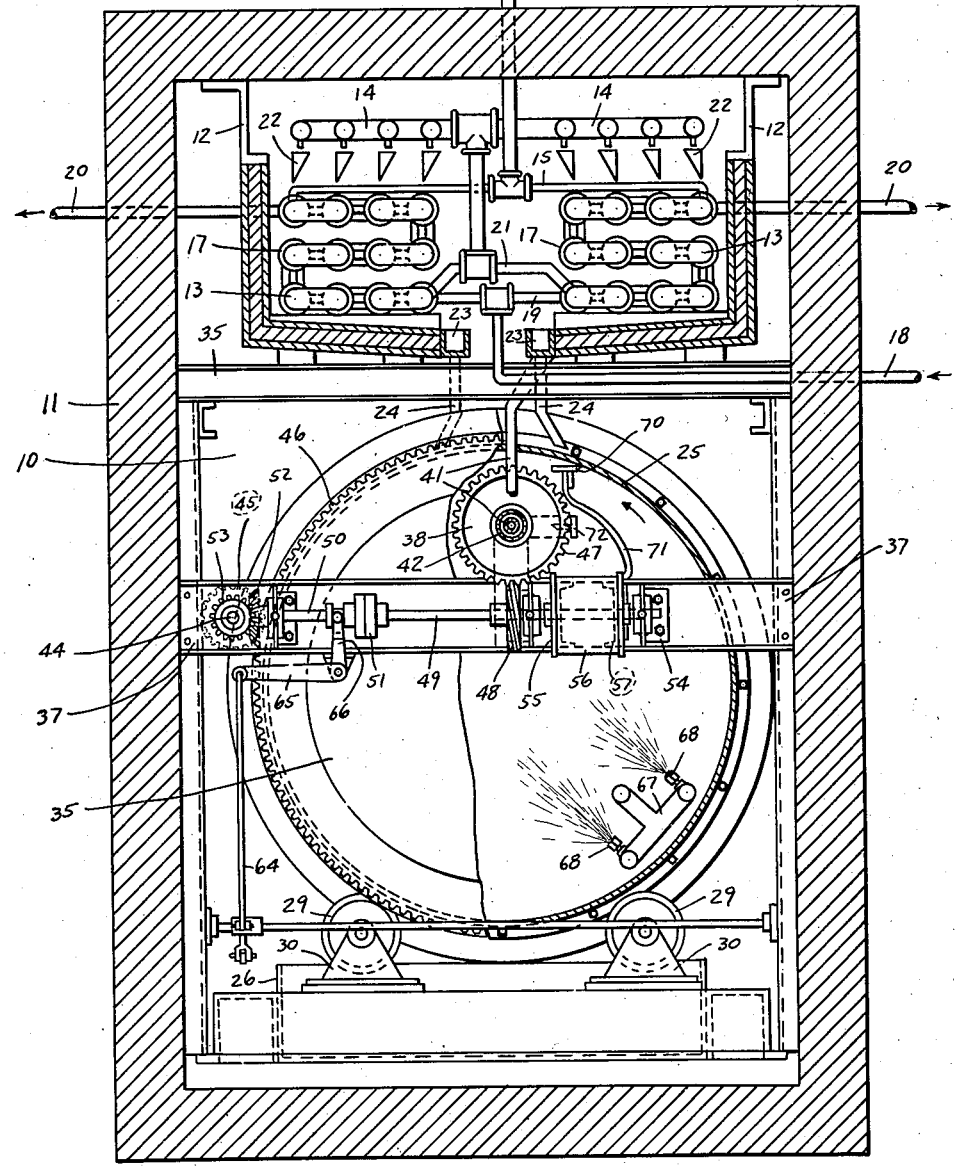

The full nature of the invention will be understood from the accompanying drawings and the following description and claims:

Fig. 1 is a central vertical section of the machine with parts thereof in elevation, and showing a packing hopper associated therewith. Fig. 2 is an end elevation thereof with parts broken away. Fig. 3 is a diagrammatic illustration of the apparatus employed in the process. Fig. 4 is an elevation with parts broken away of the pasteurizer used in the process. Fig. 5 is a central vertical section thru the filter used in the process. Fig. 6 is a side elevation illustrating the homogenizer. Fig. 7 is a side elevation illustrating the pre-cooler.

Referring first to the freezer for refrigerating the mix or substance after it has been properly conditioned, there is shown in Figs. 1 and 2 a compartment 10 surrounded by a wall 11 which may be suitably insulated for excluding heat and maintaining the air therein at a low temperature. Mounted in the upper part of the compartment and supported therein by suitable brackets 12 there is a series of refrigerating coils 13 over which brine is discharged from the brine distributing head 14. Brine is conducted to the header pipe 15 thru an inlet pipe 16, and distributed to the coils 13 which are surrounded by ammonia gas jackets 17. Ammonia gas is introduced thru the intake pipe 18 to the header 19, thru the jackets 17 of the coils, and discharged thru the pipe 20. The brine is discharged thru the header pipe 21 to the header 14 and is then distributed to the overflow troughs 22 so that the brine will pass over the ammonia jackets and into the troughs 23. From the troughs 23 the brine passes thru the distributing pipes 24 onto the surface of the rotating freezing drum 25. It will be understood that the temperature of the brine is greatly reduced by its passage thru the ammonia jackets and thereafter being caused to flow over the outer surface thereof. The brine dripping from the surface of the drum 25 is caught in a trough 26 from which it is returned to the brine pump, not shown herein, thru a pipe 27.

The refrigerating drum 25 is rotatably mounted in the lower compartment 10 upon the rollers 28 and 29. Said rollers are supported upon suitable brackets 30, the roller 28 having a flat surface for engaging the flat end band 31 of the drum, while the roller 29 has a rounded surface adapted to engage in a grooved band 32. The latter roller is adapted to maintain the drum in position while the former permits any longitudinal expansion or contraction thereof due to variations in temperature. The ends of the drum are provided with the upwardly-extending flanges 33 embracing the brine discharge pipes 24. The end edges of the drum are also provided with downwardly-extending flanges 34 forming reduced end openings in the drum which are closed by the stationary end plates 35 secured by the brackets 36 to the cross beams 37.

Mounted within the closed drum there is a refrigerating cylinder 38 supported by a bearing 39 at one end and a bracket 40 at the other end, which cylinder is rotatably mounted and is provided with a plurality of peripheral flanges for increasing the surface of radiation. Extending within said cylinder there is a brine discharge pipe 41 adapted to lead brine from one of the troughs 23 thru the cylinder, discharging it at the opposite end. The pipe 41 is surrounded by a discharge pipe 42 which permits the brine to pass from the cylinder and discharge into a pipe 43 leading to the trough 26. Thus a continual flow of refrigerating brine is passed thru said cylinder which is thereby caused to cool the air within the drum substantially below the freezing point.

The cylinder is rotated upon the rollers 28 and 29 thru the medium of a drive shaft 44 adapted to be driven from any suitable source of power, not shown herein. Keyed to the inner end of said shaft there is a gear 45 adapted to engage and mesh with the gear teeth 46 formed about the adjacent end of the drum. Said shaft is supported by suitable bearings in one of the cross bars 37. The cylinder 38 is caused to slowly rotate within the rotating drum thru the medium of a worm gear 47 driven by a worm 48, said worm being keyed to the shaft 49 extending longitudinally of the cross bar 37 and supported in suitable bearings thereon. The shaft 49 is connected with a shaft 50 thru a clutch 51. The shaft 50 is driven thru the medium of a bevel gear 52 driven by a bevel gear 53 which is keyed to the shaft 44.

Supported and keyed to an extension of the shaft 49 which is supported on bearing brackets 54 mounted on the cross bar 37 there is a pulley 55 about which a conveyor belt 56 passes, said conveyor belt passing thru suitable slots in the end plates 35 and about a bar 57 connecting the end plates 35. The other end of the conveyor belt passes over a pulley 58 mounted upon a bracket 59.

For controlling the movement of the conveyor belt, as well as the rotation of the refrigerating cylinder, there is a foot-operated pedal 60 which actuates a rod 61 thru a bell crank lever 62. The rod 61 acts thru a bell crank lever 63 at the other end thereof to operate a rod 64, which in turn is connected with a bell crank lever 65 having a connection 66 with the clutch 51. This enables the operator to control the shaft 49 which drives the belt and cylinder.

Mounted within the drum and supported by the end plates 35 there is a pair of spray headers 67 having a plurality of spray nozzles 68 mounted thereon, said headers 67 being connected with the feed-in pipe 69 thru which the mix of ice cream is forced under pressure sufficient to cause it to be discharged from the nozzles in a fine mist-like spray. This header and the nozzles are positioned adjacent one side of the drum, as shown in Fig. 2, so as to discharge the spray against the opposite side of the drum thru the intermediate space.

Mounted on the bar 57 there are scraping blades 70 adapted to engage the inner surface of the drum and the side flanges 34 thereof for scraping or forcing mix from the surface of the freezing drum and causing it to drop upon the belt 56. Said blades are held in position by the brackets 71. For scraping any frozen mix which may accumulate on the surface of the cylinder 38, there is provided a scraping knife 72, as indicated in Fig. 2. Said blade is provided with projections to extend between the flanged surface of said cylinder, as well as scrape the outer periphery thereof.

At one end of the machine immediately over the discharge end of the conveyor belt 56, there is a fruit or nut hopper 75 having a rotating discharge control wheel 76 which is rotated at the same speed as the belt 56, thru the medium of a chain drive 77. A density control hopper 78 is mounted at the discharge end of said belt for receiving the frozen particles of ice cream and causing the same to pass into a stationary fixed mouth 79 which finally discharges the frozen cream into the packing can 80, which is mounted on a conveyor 81. There is indicated a spray nozzle 82 adapted to discharge mix from a pipe 83 into the mouth 79 of the packing can 80. This is for the purpose of softening the frozen cream as it is packed therein. This unfrozen mix sprayed into the can with the frozen particles will bond said frozen particles to each other and also to the sides of the ice cream can 80, to a sufficient degree to eliminate or greatly reduce shrinkage which would otherwise be caused by the fluctuations in temperature while the ice cream remains in storage. However, this may be dispensed with excepting possibly wherein a lighter and cheaper product is desired. The spray is controlled by a valve 84 which is connected to the pedal 60 so that the spray is cut off when the belt is stopped thru the clutch 51.

The density hopper 78 is provided with a flared mouth 85 for receiving the frozen particles of cream discharged from the belt and causing them to pass thru an opening 86 in the side of the hopper. Mounted in the hopper there is a rotating arm 87 having a cup-shaped member 88 adjustable longitudinally thereof, said arm being rotated at high speed by a suitable motor or other source of power, not shown herein, in the direction indicated by the arrow, for throwing with great force "gobs" of the frozen particles gathered thereby down into the container for packing the same to the desired density. The density may be controlled by the speed of rotation of the arm, as well as by the adjustment in length of the cup member 88.

In operation, during the rotation of the drum, the surface thereof is cooled to a very low degree by the passage of brine thereover. The air or gas contained within the drum is cooled by the cylinder 38 to a low degree. The mix in liquid form is discharged after proper preparation thereof under sufficient pressure thru the nozzles 68 to cause it to spray in a fine mist against the opposite side of the drum. As it passes thru the cold air or gas of the drum, it is partially frozen sufficient to incorporate an amount of air for obtaining suitable "over-run". Thereupon the particles impinge against the cold surface of the drum and are frozen into a solid hard state. The natural tendency thereof is to adhere, due to the sugar content, to the surface of the drum while it is rotated, until such particles in the form of thin layers of flakes are scraped therefrom onto the conveyor belt 56 and carried to the hopper for packing in the cans 80.

The process as a whole, including the conditioning of the mix prior to its freezing, is illustrated in Fig. 3, wherein there is diagrammatically illustrated a pair of pasteurizing and mixing vats 100 (see Fig. 4) in which the ingredients are mixed so as to obtain the desired mix and flavoring. Two of such vats are employed so that the mix will be drawn from one for the continuous operation of the process while the other is being filled, pasteurized and held in readiness. The vats 100 are connected together with the pipe lines 101 provided with valves 102, thus enabling one of the vats to be shut off while being filled and pasteurized while the mix is being drawn from the other thru the filter 103, as shown in Fig. 3. The capacity of the vats is determined by the hourly capacity of the plant. For instance, the capacity of each vat should be approximately the capacity of the hourly capacity of the plant so as to permit the mixing and then pasteurizing for at least thirty minutes, which is the legal requirement.

As illustrated in Fig. 4, the vats 100 embody suitable coils 104 about the inner periphery thereof and the paddles 105 and 106. The paddles are rotated about the interior of the vat by means of the drive shaft 107 operated from a suitable source of power upon the end of which there is keyed the beveled gears 108 meshing with the beveled gears 110 and 111 keyed to the shafts 112 and 113 respectively, said shafts being connected with the respective paddles 105 and 106, the paddles are operated in opposite directions.

The filter, as illustrated in Fig. 5, comprises a cylindrical housing 114 having a removable top 115 in which there is a filter bag 116 mounted upon the frame rods 117 resiliently held by the springs 118 from the top thereof, the mix passing into the filter bag thru the bottom of the filter from the pipe 101 and out thru the top of the filter to the homogenizer thru the pipe 119.

The mix, then passing into the homogenizer 120 as shown in Fig. 6, thru the pipe 110, is highly compressed by the pressure pump 121 having plunger rod 122 operated by the eccentric 123 thru the cross-head 124. The eccentric is driven by the gear 125 from a motor 126 thru the chain and sprocket 127 having a gear thereon meshing with the gear 125. The mix drawn into the pump thru the line 119 is forced thru the homogenizer valve 128 and thence thru the pipe 129 to the precooler. A by-pass 130 is provided thru the pressure valve 131 back to the intake pipe 119.

The pre-cooler (see Figure 7) is herein shown as comprising a plurality of tubes 132 through which the mix passes from the pipe 129 and is discharged through the pipe 133 to the spray nozzles 68 in the freezing machine. Whenever the pre-cooling is to be carried close to the freezing temperature of the material, suitable agitating mechanism (not shown) is provided in the pre-cooler to prevent undesirable pre-freezing and to provide uniformity in the cooling of the material. The said agitating mechanism may be constructed after the manner of that shown in my Patent No. 1,783,864, issued December 2, 1930.

From the foregoing, it will be observed that the process is continuous as the mix leaves the sterilizing vats until it is packed in the packing cans or discharged in any other finished form in a finally hardened state so as to eliminate the requirement that it be held for an appreciable length of time in a hardening room. It will further be noted that the mix is not handled or manually manipulated, but will remain in a closed circuit until the freezing thereof is completed and it is automatically packed in the cans. The capacity of the machine will depend only upon the quantity of mix sprayed thru the spray nozzles in the freezer which in turn must depend upon the area of the freezing surface of the drum of which the freezer is comprised.

It will be particularly noted that the long delay involving 24 to 48 hours for holding the homogenized mix in refrigerated tanks while agitating the same for the purpose of "ripening" or "ageing", is entirely eliminated, thus effecting a great saving in time. Since the purpose of this step is merely to thicken the mixture and make it more viscous so as to permit air to be whipped therein, the same is obtained in this process by reason of spraying the mix in a mist-like form thru refrigerating atmosphere on to the freezing surface of the freezer which incorporates therein the desired amount of air or gas, giving the desired over-run.

While the process has been more particularly described with respect to the freezing of ice cream or the like, its application to cooling and bleaching vegetable oils or similar substances will be apparent. For this purpose, such vegetable oils may be discharged thru the spray nozzles in a fine spray so as to pass thru the refrigerating atmosphere of the drum which, if desired, may be in the form of hydrogen, carbon dioxide or other gases having the desired properties. In this connection, the temperature of the atmosphere, as well as the surface of the drum may be regulated to bring the substances to the proper temperature.

The invention claimed is:

1. The process of refrigerating a substance, consisting of continuously discharging the substance under pressure as a spray into a refrigerated space of such temperature as to cause the substance to be cooled in the atmosphere, and subsequently causing said cooled substance to impinge upon and adhere to a refrigerated surface so as to become further cooled by contact therewith and continuously removing said cooled substance from said surface.

2. The process of refrigerating a substance, consisting of continuously discharging the substance under pressure as a spray into a closed container having its surface and the atmosphere container therein cooled to such a temperature as to cause the substance to become cooled before reaching the surface for incorporating a portion of the atmosphere therein, causing said substance to adhere to said surface and to become further cooled upon contact therewith and continuously removing said substance from said surface.

3. The process of refrigerating a substance, consisting of continuously discharging the substance under pressure as a spray on to a cooling surface at such a distance therefrom and in such a pre-cooled atmosphere as to cause said mix to become cooled with some of the atmosphere incorporated therein during its passage to said surface, causing said substance to adhere to said surface and to become further cooled and upon engagement therewith and continuously removing said substance from said surface.

4. The process of refrigerating a substance, consisting of continuously discharging the substance under pressure as a spray into a chamber having its surface cooled to such a temperature as to cause the liquid particles to freeze and become hardened in a thin film on the inner surface thereof and continuously removing said film therefrom.

5. The process of continuously freezing ice cream or the like consisting of mixing and pasteurizing the mix and thereafter continuously passing the same thru a homogenizer and discharging the homogenized mix under pressure in a mist-like spray through a refrigerating atmosphere on to a freezing surface of such temperature as to cause the liquid particles to freeze and become hardened and continuously removing said hardened particles therefrom.

6. The process of continuously freezing ice cream or the like, consisting of mixing and sterilizing the mix in a plurality of suitable containers, drawing the same from first one container and then the other and causing it to pass thru a homogenizer and pre-cooler, thereafter continuously spraying the same on to a freezing surface of such temperature as to cause the liquid particles to freeze and become hardened and continuously removing the hardened particles from said surface.

7. The process of continuously freezing ice cream or the like, consisting of mixing and pasteurizing the desired mix, and thereafter continuously passing the same thru a homogenizer and a pre-cooler, and thereupon discharging such homogenized and pre-cooled mix under pressure in a mist-like spray through a refrigerating atmosphere on to a freezing surface of such temperature as to cause the liquid particles to freeze and become hardened, scraping said frozen particles from the surface and discharging them into suitable containers.

8. The process of freezing ice cream or the like, consisting of freezing a suitable mix into hardened particles, discharging said hardened particles into a suitable container and incorporating therewith unfrozen mix in liquid form for providing a suitable binder.

9. The process of freezing ice cream or the like, consisting of discharging a suitable mix under pressure in a mist-like spray on to a freezing surface of such temperature as to cause the liquid particles to freeze and become hardened thereon, scraping said frozen particles from the surface and discharging them into suitable containers, and discharging unfrozen mix in liquid form into said containers with said frozen particles for providing a suitable binder therefor.

10. The process of continuously freezing ice cream or the like, consisting of mixing and pasteurizing the desired mix, thereafter continuously passing the same thru a homogenizer and a pre-cooler, thereupon discharging such homogenized and pre-cooled mix under pressure in a mist-like spray into an enclosed compartment having a freezing surface adapted to receive said spray and cause the same to become frozen and hardened and continuously removing the hardened material from said surface.

11. The process of continuously freezing ice cream or the like, consisting of mixing and pasteurizing the desired mix, and thereafter continuously passing the same thru a homogenizer and a pre-cooler, and thereupon discharging such homogenized and pre-cooled mix under pressure in a mist-like spray into an enclosed compartment having a freezing surface adapted to receive said spray and cause the same to become frozen and hardened, and scraping the hardened particles from the inner surface of said compartment on to a conveyor for discharging the same.

In witness whereof, I have hereunto affixed my signature.

CLARENCE W. VOGT.